United States Patent

[11] 3,539,151

[72] Inventors Otto S. Reid
La Canada, and
Carl E. Frahm, Arcadia, California
(both c/o Reid Valve Company, Inc.,
133 E. Maple Ave., Monrovia, California
91016)
[21] Appl. No. 710,504
[22] Filed March 5, 1968
[45] Patented Nov. 10, 1970

[54] VALVE CONSTRUCTION
4 Claims, 4 Drawing Figs.
[52] U.S. Cl. .................................................. 251/242,
251/244, 251/284, 251/321, 137/801
[51] Int. Cl. ...................................................... F16k 1/08,
F16k 31/524
[50] Field of Search.......................................... 251/240,
242, 243, 244, 245, 246, 247, 284, 320, 321, 322,
323; 137/801

[56] References Cited
UNITED STATES PATENTS
2,288,954   7/1942   Reid .............................   251/322
2,497,557   2/1950   Reeves .........................   251/243
2,766,772   10/1956  Welty et al ...................   251/284X
2,989,283   6/1961   Klingler .......................   251/243

Primary Examiner—William F. O'Dea
Assistant Examiner—David R. Matthews
Attorney—Lyon and Lyon ABSTRACT: A normally closed valve has a generally U-shaped rod slidably mounted in a valve housing. Such rod carries an elastic valve element on one end and an abutment on the other end. A manually operated lever is pivoted on the housing and engages an abutment on the other end of the rod to move such valve element from its seat. The valve element is generally hemispherical and dome-shaped and engages a tapered valve seat and such valve element is pressed into engagement with the seat by a generally hemispherical and dome shaped element on the end of the rod.

Patented Nov. 10, 1970
3,539,151
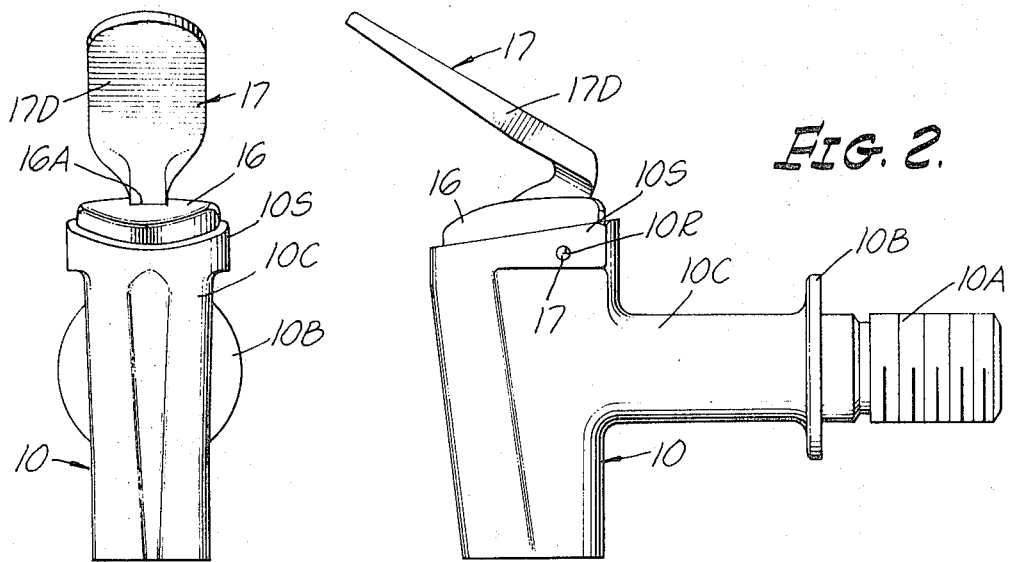
FIG. 1.
FIG. 2.
FIG. 4.
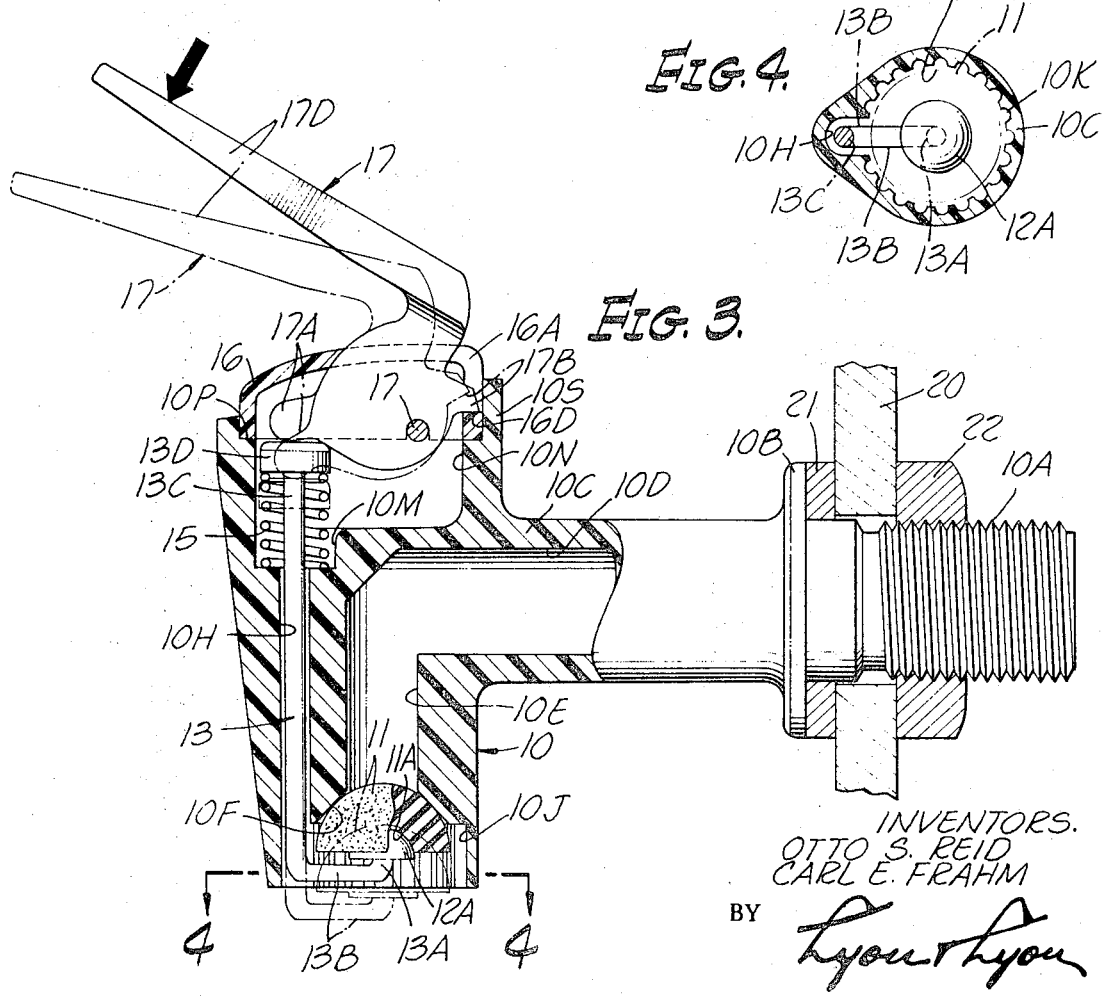
FIG. 3.
INVENTORS.
OTTO S. REID
CARL E. FRAHM
BY Lyon & Lyon
ATTORNEYS

VALVE CONSTRUCTION

It is therefore a general object of the present invention to provide an improved valve which is capable of providing good sealing action and which is capable of being opened with relatively small force.

It is therefore a general object of the present invention to provide a valve construction having the above-indicated features.

A specific object of the present invention is to provide a valve construction of this character using a new actuating mechanism.

Another specific object of the present invention is to provide a valve construction of this character in which the component parts may be made inexpensively and assembled expeditiously.

Another specific object of the present invention is to provide a valve construction of this character in which long leak-proof life is assured using relatively inexpensive constructions.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is a view in front elevation of a valve embodying features of the present invention.

FIG. 2 is a side view of the same.

FIG. 3 is a view like FIG. 2 but with some parts shown in section and also with the operating handle in different operating positions.

FIG. 4 is a sectional view taken as indicated by line 4—4 in FIG. 3.

The valve body 10 is a of single piece plastic material and includes a threaded nipple portion 10A, a flanged portion 10B and a body portion 10C having two intersecting bores 10D and 10E, the bore 10D being in communication with the bore in nipple portion 10A and the lower end of bore 10E terminating in an annular tapered valve seat 10F which is normally engaged by a generally hemispherical dome shaped valve element 11 of elastic material such as, for example, rubber to close such opening and hence to close the valve properly.

The valve element 11 has a concave inner bearing surface 11A which is engaged by a complementary convex surface of a hemispherical dome shaped metal pressure applying element 12A on the upper end portion 13A of a metal rod 13, such rod 13 being bent in a generally U-shaped pattern to provide this vertical portion 13A, and the horizontal portion 13B that interconnects such vertical portion 13A with the vertically extended leg portion 13C.

This vertical portion 13C loosely extends through a guide bore 10H in body 10, such bore 10H at its lower end terminating near a circular recessed portion 10J defined by a serrated or grooved circular wall 10K engageable with the peripheral portion of valve element 11 for guiding the movement of the same with relatively small frictional resistance.

The upper end of rod portion 13C extends through an enlarged recessed portion 10M and into a still larger recessed portion 10N having an internal shoulder portion 10P and mounts an enlarged abutment element 13D which serves to maintain a coil spring 15 in compressed condition between such abutment 13D and the base portion of recess 10M.

A slotted cap 16 is snugly received in opening 10N and contacts the annular flange portion 10P which serves as a seat for the cap 16. Extending through the slot 16A of cap 16 is an actuating member 17 which is retained by a dowel type pin 17, such pin 17 extending into and having its opposite ends engaging spaced apertured portions 10R in the circular lip portion 10S above shoulder 10P.

Actuating member 17 is in the form of a lever having a flat bulbous end portion 17A engageable with abutment 13D and a flat planar end portion 17B engageable with a portion 16D of cap 16. The flat portion of lever 17 extends through the generally rectangular slotted portion 16A and has integrally formed therewith the enlarged handle portion 17D that offers a convenient large flat surface for application of thumb pressure for purposes of opening the valve when desired.

It will be seen that the valve may be opened by applying thumb pressure to actuating element 17 to turn it in the counterclockwise direction in FIG. 3 whereupon the bulbous end portion 17A engages and presses the abutment 13D downwardly to overcome the force of prestressed spring 15 and open the valve 10F, 11. This valve automatically closes upon release of such finger or thumb pressure and since the projected area of the metal element 12A is large enough to encompass a substantial portion of valve seat 10F there is a uniform pressure applied to elastic valve element 11 to assure long leakproof life.

The valve described may be used on dispensers for dispensing drinking water from five gallon bottles and in such instance the valve may be mounted on a base portion 20 of the dispenser using a washer 21 and nut 22 on opposite sides of such base portion 20 as shown in FIG. 3.

We claim:

1. In a valve construction of the character described a valve housing defining a valve seat; a movable valve element cooperating with said seat; said valve housing having a lower open cavity portion for receiving and housing said valve element; said valve housing having an upper open cavity portion defined by an interior base portion; said valve housing having a channel intercommunicating said upper and lower cavity portions; said base portion having a recessed portion contiguous with said channel; a generally U-shaped actuating rod having an extended leg portion on one end thereof passing through said channel and said recessed portion; the other end of said rod having said movable valve element attached thereto; a coil compression spring extending within said recessed portion and being confined thereby; an abutment on said rod and maintaining said spring in a compressed condition to normally urge said valve element into engagement with said seat; a lever extending into said upper portion and having a bulbous end portion engageable with said abutment; a pivot pin on said housing and extending through an intermediate portion of said lever to pivotally support said lever on said housing; and a cover member extending into and closing said upper cavity portion and having a slotted portion embracing said lever where said lever extends from said housing to guide movement of said lever, said lever having a projecting portion engageable with a portion of said cover member to retain said cover member in said upper cavity portion.

2. A valve construction as set forth in claim 1 in which said valve element includes: a generally hemispherical valve member engaging said seat; and a generally hemispherical backing member on said rod contacting said valve member, said backing member having a projected area larger than the area defined by said valve seat.

3. A valve construction as set forth in claim 2 in which said lower open cavity portion is defined by a generally cylindrical surface which has a plurality of longitudinally extending slots to define a limited area contacted by the peripheral portion of said hemispherical valve member for purposes of guiding movement of said valve element when operated by pressure applied to said lever.

4. A valve construction as set forth in claim 3 wherein said generally hemispherical valve member is of elastic rubberlike material having a convex outer surface; and said backing member has a generally spherical concave surface engaging a mating inner convex surface of said rubberlike material.